April 19, 1938. W. L. REID 2,114,811
STEAM PIPE CASING
Filed Jan. 21, 1935
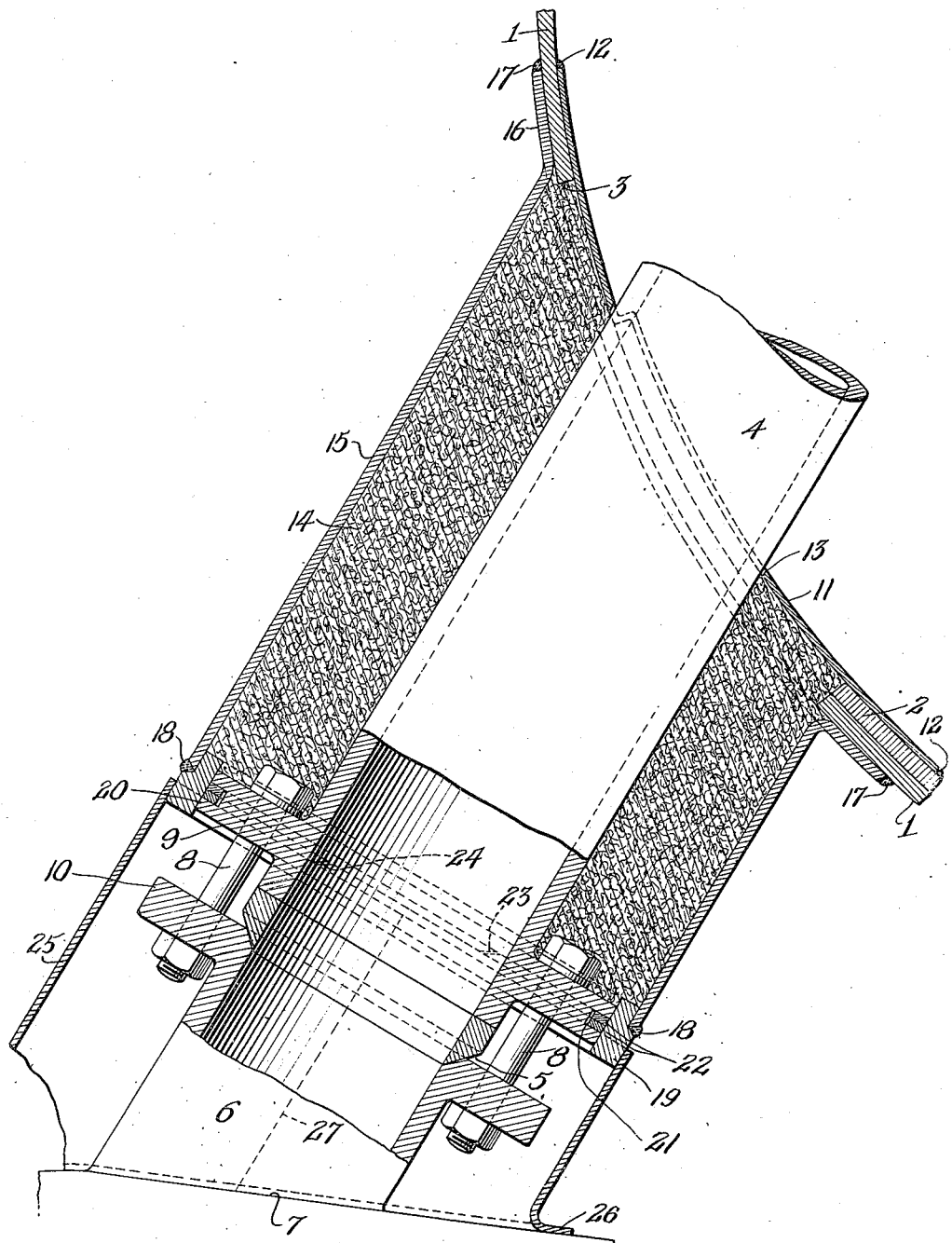
INVENTOR
William L. Reid
BY
Synnestvedt & Lechner
ATTORNEYS

UNITED STATES PATENT OFFICE 2,114,811

STEAM PIPE CASING

William L. Reid, Lima, Ohio; Leslie Reid and William H. Reid administrators of said William L. Reid, deceased Application January 21, 1935, Serial No. 2,708

9 Claims. (Cl. 105—37)

This invention relates in general to steam pipe casings and the like, and particularly to casings for outside steam pipes of locomotives, being especially adapted to serve the combined functions of enclosing and insulating the steam pipes which extend outside of the smoke-box and sealing the openings in the smoke-box shell through which the steam pipes extend.

The nature and advantages of the invention will be readily recognized when some of the difficulties and disadvantages of prior practice are understood. In this art, it has been a constant, annoying, and expensive problem to properly insulate and encase the sections of steam pipe (including the joints therein) extending from the smoke-box to the valve chests and to maintain at the same time a substantially air-tight closure of the apertures in the smoke-box shell through which such steam pipes must pass.

It is obvious that if a good tight steam pipe casing is employed, particularly if the same be connected with the smoke-box shell and with the periphery of the steam pipe in order to seal the aperture in said shell through which the pipe passes, it is only a short time until relative shifting and movement of the parts, due to expansion and contraction, vibration, "weaving" and the like, results in breakage of the pipe casing and/or rupture of the seal. Furthermore, the employment of diaphragm-like members, or equivalent elements, welded in place, does not entirely obviate these difficulties, and adds a disadvantage in rendering it more difficult to inspect, repair and replace the steam pipes and steam pipe joint parts. Still other expedients have been tried, such as packing glands, cumbersome fittings, etc., but usually with even less success.

The present invention contemplates overcoming the foregoing difficulties, by the provision of a sliding joint interposed between some part of or on the smoke-box shell and some part of or on the associated steam pipe, and fitted with snap-rings in such a way as to maintain a substantially air- and gas-tight fit between the associated parts; this assembly preferably being formed also as a casing for the steam pipe itself and as a retaining cover for the lagging around the pipe.

More specifically, the invention involves the provision of a steam pipe casing or tubular sleeve, flanged at its upper end for air-tight juncture with the smoke-box shell peripherally around the opening through which the pipe passes, and formed at its lower end to cooperate with a flange of the pipe, one or more split or snap-rings being interposed at that point, to maintain a tight but sliding fit. In order to make the construction sturdy and also capable of withstanding wear over a considerable period of time, I prefer to secure a relatively thick or heavy collar on the lower end of the thin casing, the inner periphery of said collar being of accurate annular formation and of smooth surface so as to have a fairly close but sliding fit with the outside periphery of the pipe flange; and a peripheral slot or groove is cut, preferably in the pipe flange, into which a pair of snap-rings is compressed, these rings being split, with the gap in one ring angularly removed from that of the other ring, so that upon assembly a substantially air-tight seal is provided at the sliding joint between said collar and said flange.

The invention further involves the retaining of the pipe lagging in an annular recess bounded on its inner side by the steam pipe, on its outer side by the said tubular casing, at its lower end by a steam pipe flange, and at its upper end by a ring-like metallic plate secured at the inner face of the smoke-box shell and surrounding the steam pipe with a slight clearance relative thereto.

The invention further provides for the completion of the steam pipe casing by means of a second (lower) casing portion, which preferably surrounds that part of the steam pipe which is integral with the valve chest, and also preferably encloses the joint between the two parts of the steam pipe; and in this regard I contemplate utilizing the above-mentioned collar as a support for the upper end of the lower part of the pipe casing. This second casing part may be flanged at its lower end for attachment to the valve chest and may have an ordinary sliding fit with the said collar, since there is no necessity for an air-tight joint at this point. I preferably also insert insulating material around the steam pipe within the confines of this portion of the casing, and this part of the casing is preferably longitudinally split so that it may be readily removed, for access to the lagging and to the steam pipe and joint.

How the foregoing objects and advantages are obtained by my invention, together with such other results as may be incident thereto or may occur to those skilled in the art, will appear from the following description, taken together with the accompanying drawing.

The figure is a sectional view taken on a vertical plane extending generally transverse the smoke-box, fragmentarily illustrating the smoke-box shell and a steam pipe leading therethrough to a valve chest, and showing the application of my improvements, a portion of the valve chest being indicated in elevation, and parts of the steam piping being also shown in elevation.

The smoke-box shell, which in accordance with known practice may comprise overlapping joined plates 1, 2 and the like, is apertured (the peripheral wall of the aperture being indicated at 3) to pass the live steam pipe 4. Since such pipes are usually curved inside the smoke-box, the aperture in the shell must be of substantial diameter, for purposes of assembly and repair.

The lower end of the pipe 4 is fitted with a ball-faced ring, which fits a ball seat in the upper end of the steam pipe member 6, which latter is usually integral with the valve chest or steam chest 7. The connection between the two pipe parts is maintained by means of bolts 8 passing through the pipe flanges 9 and 10.

Plate means 11 may be applied at the inner face of the smoke-box shell, and secured in any suitable manner as by welding 12, there being an aperture through this plate means at 13, to accommodate the pipe 4.

It will be seen that the pipe 4 and its lagging 14 are encased by the tubular metallic sleeve 15 of the present invention, said sleeve being made, for example, of relatively thin sheet steel. As before mentioned, for attachment to the smoke-box shell, the casing 15 may be flanged at 16 for welding to said shell all the way around the flange, as indicated at 17. In effect, it forms a smoke-box extension.

The lower end of the sleeve or casing 15 may be fitted into a shoulder and is welded around its periphery, at 18, on a collar member or ring 19, which is formed, ground, or finished, at its inner side, to a true annular contour, of a diameter such as will make a sliding fit with the peripheral face 20 of the flange 9.

The said face has a peripheral slot 21, receiving two springy rings 22, 22, one of which is split at 23 and the other at 24. These rings press outwardly against the inner surface of the member 19, thereby completing a tight seal for the smoke-box shell and preventing the ingress of air in any appreciable amount. The asbestos, or magnesia lagging or other suitable insulating material 14 is packed into the casing 15 from the lower end before completion of the assembly, or may be inserted from the upper end before the securing of the plate 3, or the casing 15 may be split longitudinally, and applied in sections after the application of the lagging. In any event, the lagging is kept properly in place by the pocket formation which results from the assembly.

I prefer to enclose the pipe joint and the lower pipe element 6 by means of a lower casing portion 25 which may be flanged at the bottom, as indicated at 26, for attachment to the valve chest. This casing part may, for convenience of application and removal, be split longitudinally, as indicated at 27; and lagging (not shown) may fill the space within the shell 25, just as shown at 14 within the shell 15. The ring 19 forms a support for the upper end of this casing part, and the fit may be made an easy sliding one at this point.

From this detailed description of a structural embodiment of my invention, it will be quite evident how the objects and advantages thereof are attained, and how the difficulties and problems peculiar to steam pipe enclosure and smoke-box sealing have been overcome. However, it might also be pointed out that in addition to caring for vibration and relative expansion and contraction between the steam pipe, the smoke-box, and the sealing device, as well as the other advantages hereinbefore discussed, the structure of the invention is simple, light in weight, inexpensive, and easy to install, inspect and maintain. It will also be seen that the pipe flange acts in a threefold capacity of pipe joint member, seal joint member, and lagging retainer.

I claim:—

1. In a locomotive having an apertured smoke-box shell and a valve chest, a steam pipe extending through said aperture and having a flanged joint connection to the valve chest, an insulation-retaining casing surrounding said steam pipe and divided into upper and lower portions, the upper portion of said casing having its upper end tightly secured to the smoke-box around the periphery of said aperture and having its lower end adjacent a flange of said pipe connection, with a snap-ring positioned to form a tight sliding fit between said lower end and said flange, and the lower portion having its lower end associated with the valve chest and its upper end slidably associated with respect to the lower end of the upper casing portion, said lower casing portion being readily removable for access to the pipe joint.

2. In combination with an apertured smoke-box shell and a pipe extending therethrough comprising upper and lower pipe members with a flanged joint between them, a tubular casing surrounding said upper pipe member and tightly joined to the shell around the aperture, a sliding joint between the casing and the flange of said upper pipe member, and a ring sprung into said sliding joint and bearing against a sliding surface thereof, together with a second casing member enclosing the adjoining lower pipe member and the flanged joint and co-operating with the first mentioned casing but removable independently thereof to expose the flanged joint.

3. In combination with an apertured smoke-box shell and a pipe extending therethrough, a substantially gas-tight tubular casing surrounding said pipe and tightly joined to the shell around the aperture, a sliding joint between the casing and the pipe, and a ring sprung into said joint and bearing against a sliding surface thereof, together with a second casing member around an adjoining pipe portion and supported at one end by the first mentioned casing but being split for removal independently thereof.

4. In a locomotive, an apertured smoke-box shell, a pipe extending through said aperture with peripheral clearance, said pipe being subject to vibration and thermal expansion, an annular member encircling the pipe and having substantially gas-tight connection to said shell, another annular member having substantially gas-tight connection to said pipe and projecting peripherally therefrom, said members having co-operating surfaces in slidable telescopic relationship, a continuous external peripheral groove on the inner of said members, and a resilient ring in said groove having a sliding fit with the lateral walls of the groove and bearing outwardly against the inner co-operating surface of the outer of said members, by which construction the aperture is sealed as against appreciable influx of air or efflux of gases therethrough, under all normal operating conditions.

5. In a locomotive having an apertured smoke-box shell, a steam pipe extending with clearance through said aperture and having a flanged joint located exteriorly of the smoke-box, said joint comprising an upper flange and a lower flange with bolts connecting said flanges, a casing in peripherally spaced relation around the pipe comprising an upper portion tightly secured at its upper end to said shell and having an internal peripheral wear-surface at its lower end in sliding contact with the peripheral surface of said upper flange, said casing further comprising a lower portion enclosing said lower flange and bolts, a continuous external groove in said peripheral surface of the upper flange, a resilient ring compressed into said groove in position to bear outwardly against said wear-surface so as to seal the smoke-box aperture, lagging in position between said casing and pipe, said upper flange serving as a pipe-joint member, as a ring positioning member and as a lagging retaining member, and means for the ready detachment of the lower portion of said casing whereby access is had to the pipe joint bolts without disturbing the sliding joint.

6. In a locomotive, an apertured smoke-box shell, a pipe extending through said aperture and subject to vibration and expansion and contraction relative to the shell, a tubular casing surrounding said pipe and tightly joined to the shell around the aperture, a sliding joint between the casing and the pipe providing a seal between the atmosphere and the interior of the smoke-box, a resilient ring sprung into said joint and bearing against a sliding surface thereof, lagging around the pipe within said casing, and a flange on the pipe forming a part of the sliding joint and positioned to cooperate with the pipe and casing to retain the lagging in place.

7. In a locomotive, an apertured smoke-box shell, a pipe extending through said aperture and subject to vibration and expansion and contraction relative to the shell, a flanged joint in said pipe, a tubular casing surrounding the pipe and tightly joined to the shell around the aperture, and a sliding joint providing a seal between atmosphere and the interior of the smoke-box, said joint including a groove or slot in the periphery of a flange of the pipe joint, and a split snap-ring in said groove and pressing against the inside of the casing.

8. In a locomotive, a steam chest, an apertured smoke-box shell having a tubular extension, a steam pipe extending through said aperture and extension and connected with the steam chest, a sliding joint between said pipe and said tubular extension providing a seal between atmosphere and the interior of the smoke-box, said joint including a flange on said pipe having a continuous external peripheral recess, and a snap-ring compressed into said recess in position to expand against a relatively sliding internal surface on said extension.

9. In a locomotive, a steam chest, an apertured smoke-box shell having a tubular extension, a steam pipe extending through said aperture and extension and connected with the steam chest, a sliding joint between said pipe and said tubular extension providing a seal between atmosphere and the interior of the smoke-box, said joint including a continuous external flange on said pipe having a peripheral recess and a cooperating ring or collar member on said tubular extension, and a snap-ring compressed into said flange recess in position to spring outwardly against the inner surface of said cooperating collar member.

WILLIAM L. REID.